(12) United States Patent
Behle et al.

(10) Patent No.: US 7,018,153 B2
(45) Date of Patent: Mar. 28, 2006

(54) PLASTIC NUT TO BE FITTED TO A COMPONENT

(75) Inventors: Jürgen Behle, Bad Laasphe (DE);
Gottfried Koenig, Bad Laasphe (DE);
Günter Welik, Bad Laasphe (DE)

(73) Assignee: EJOT GmbH & Co. KG, (DE)

( * ) Notice: Subject to any disclaimer, the term of this patent is extended or adjusted under 35 U.S.C. 154(b) by 30 days.

(21) Appl. No.: 10/633,591

(22) Filed: Aug. 5, 2003

(65) Prior Publication Data

US 2004/0081533 A1  Apr. 29, 2004

(30) Foreign Application Priority Data

Aug. 5, 2002   (DE) ............................. 102 35 799

(51) Int. Cl.
*F16B 37/04*   (2006.01)
(52) U.S. Cl. ..................................... 411/182
(58) Field of Classification Search ................ 411/182, 411/508–512, 913, 368–369, 371.1, 371.2, 411/370, 372, 542
See application file for complete search history.

(56) References Cited

U.S. PATENT DOCUMENTS

| | | | | |
|---|---|---|---|---|
| 2,872,961 A | * | 2/1959 | Mills et al. ................. | 411/303 |
| 3,131,742 A | * | 5/1964 | Munse ....................... | 411/301 |
| 3,489,312 A | * | 1/1970 | Hunckler et al. ........... | 220/235 |
| 3,534,797 A | * | 10/1970 | Haug et al. ................. | 411/108 |
| 3,910,588 A | * | 10/1975 | Austin ....................... | 411/542 |
| 4,041,834 A | * | 8/1977 | Herkes et al. ............. | 411/82.2 |
| 4,092,896 A | * | 6/1978 | Puchy ........................ | 411/542 |
| 4,712,802 A | * | 12/1987 | Hewison et al. ........... | 411/542 |
| 4,832,551 A | * | 5/1989 | Wollar ....................... | 411/280 |
| 4,840,522 A | * | 6/1989 | Kurihara .................... | 411/44 |
| 4,875,818 A | * | 10/1989 | Reinwall .................... | 411/369 |
| 4,948,314 A | * | 8/1990 | Kurosaki ................... | 411/182 |
| 5,173,026 A | * | 12/1992 | Cordola et al. ............ | 411/508 |
| 5,217,337 A | * | 6/1993 | Junemann et al. .......... | 411/45 |
| 5,301,396 A | * | 4/1994 | Benoit ....................... | 24/453 |

(Continued)

Primary Examiner—Flemming Saether
Assistant Examiner—Jeffrey A. Sharp
(74) Attorney, Agent, or Firm—Banner & Witcoff, Ltd.

(57) ABSTRACT

The invention relates to a plastic nut to be fitted to a component having an aperture, which, with a nut piece serving to hold a screw, can be plugged into the aperture and which, in order to bear on one side of the component, is provided with a flange which has a through hole for the screw and, on its side facing the component, has a sealing washer and, in order to bear on the other side of the component, is provided with snap-action hooks which, after insertion, spread out as the screw is tightened in the accommodation hole in the plastic nut and therefore secure the plastic nut to the component. The sealing washer has at its outer rim a shoulder which encloses the flange and projects beyond the thickness of the latter and, from its inner rim, merges into a collar which projects into the through hole.

20 Claims, 2 Drawing Sheets

U.S. PATENT DOCUMENTS

| | | | |
|---|---|---|---|
| 5,314,280 A * | 5/1994 | Gagliardi et al. | 411/182 |
| 5,636,953 A * | 6/1997 | Jaeger et al. | 411/82.5 |
| 5,725,343 A * | 3/1998 | Smith | 411/55 |
| 5,738,476 A * | 4/1998 | Assimakopoulos | 411/508 |
| 5,846,040 A * | 12/1998 | Ueno | 411/45 |
| 5,857,244 A * | 1/1999 | Edwards et al. | 24/297 |
| 5,906,463 A * | 5/1999 | Damm et al. | 411/369 |
| 6,264,393 B1 * | 7/2001 | Kraus | 403/282 |
| 6,315,510 B1 * | 11/2001 | Sturies et al. | 411/182 |
| 6,443,678 B1 * | 9/2002 | Mizuno et al. | 411/182 |
| 6,560,819 B1 * | 5/2003 | Mizuno et al. | 16/2.2 |
| 2004/0156694 A1 * | 8/2004 | Behle et al. | 411/182 |

* cited by examiner

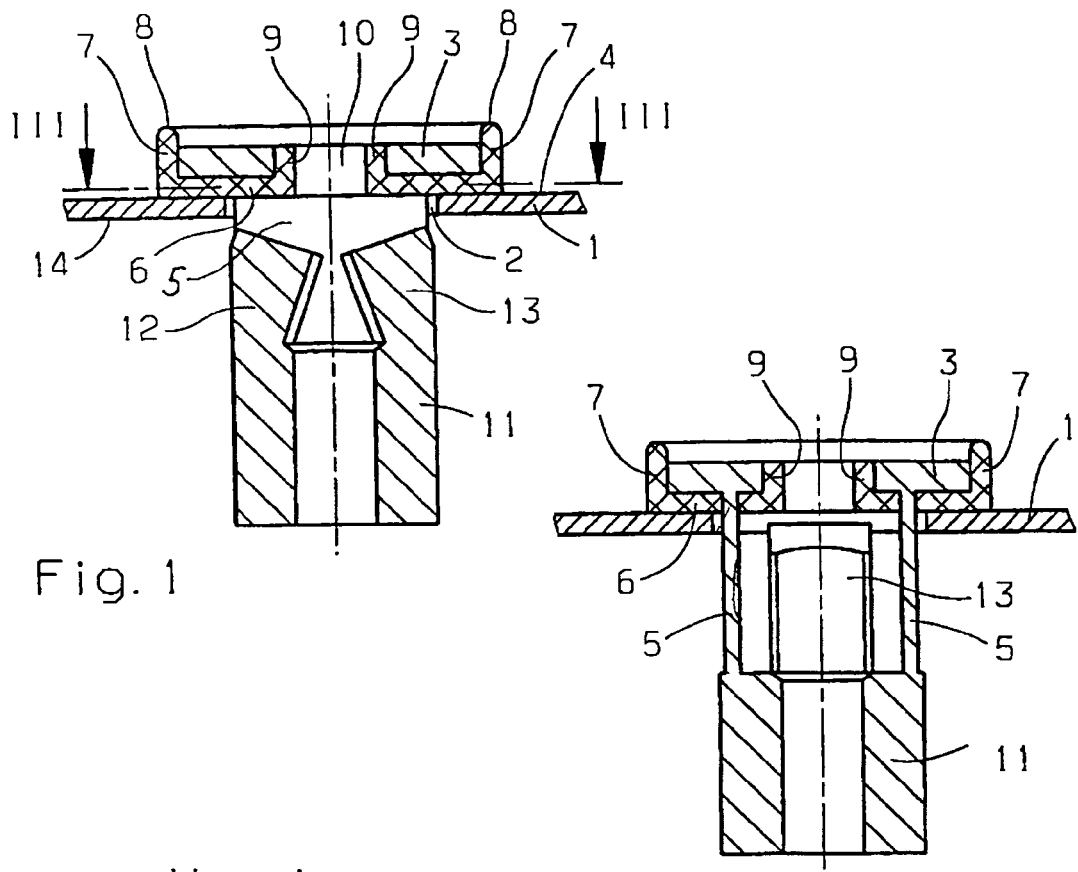
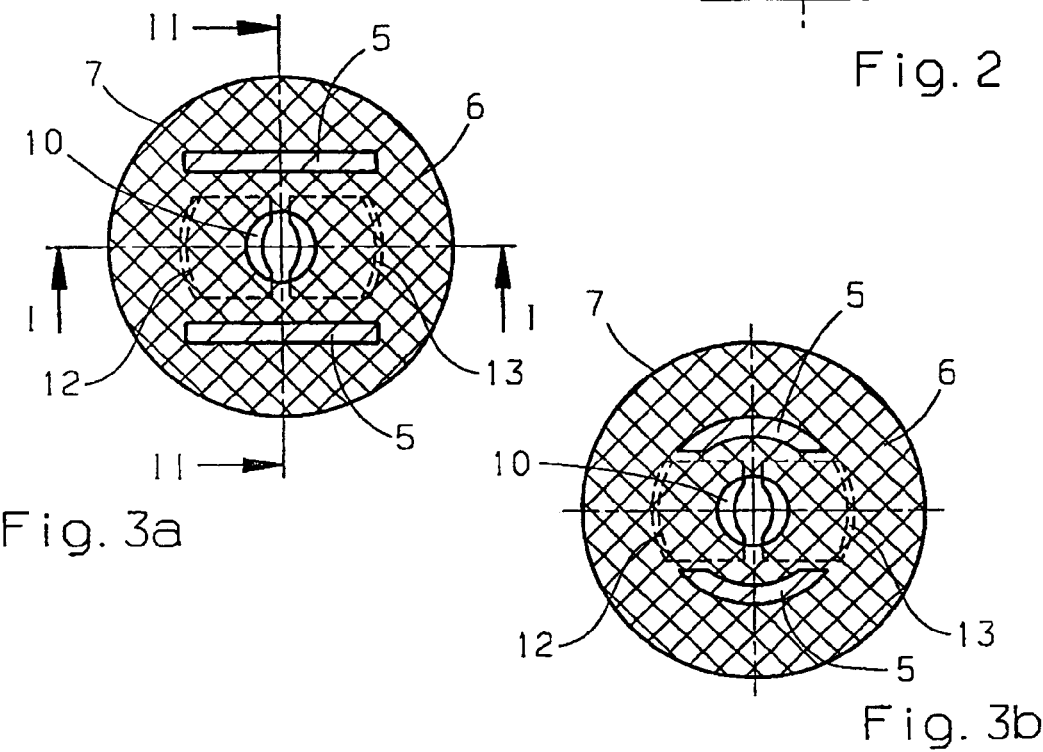

PLASTIC NUT TO BE FITTED TO A COMPONENT

The invention relates to a plastic nut to be fitted to a component having an aperture, which, with a nut piece serving to hold a screw, can be plugged into the aperture and which, in order to bear on one side of the component, is provided with a flange which has a through hole for the screw and, on its side facing the component, has a sealing washer and, in order to bear on the other side of the component, is provided with snap-action hooks which, after insertion, spread out as the screw is tightened in the accommodation hole in the plastic nut and therefore secure the plastic nut to the component.

A plastic nut of this type is illustrated and described in EP 1 143 157 A1. The known plastic nut serves to be inserted in a rectangular hole in a plate, which corresponds to the above-mentioned component. It has a flange which, on one side of the plate, bears against the latter, and a nut piece, which is led through the rectangular hole. Fitted to the nut piece, via a bending zone in each case, are two snap-action books which are oriented obliquely outwards in the direction of the flange and, upon insertion into the rectangular hole, are compressed together until, following complete insertion into the rectangular hole, they spread outwards and therefore secure the plastic nut to the plate. The plastic nut is used in particular for fitting a further module to the component, for which purpose the plastic nut is pushed into the rectangular hole and the module to be fitted is screwed on by means of a screw inserted into the plastic nut. In this case, a flat sealing washer made of rubber fitted to the inner side of the flange ensures a certain amount of sealing in the area of the flange. The idea of using a flat sealing washer in a nut piece that can be inserted into a plate, specifically between a flange of this nut piece and the plate, is also proposed in EP 358 896 B1. However, reliable sealing of the area on one side of the component with respect to the other side of the component cannot be achieved with the known seals, since leaks can arise, in particular in the area of the screw.

The invention is based on the object of configuring the plastic nut in such a way that, by using it, secure sealing is achieved in particular even in the area of the aperture, which is of importance in particular in automobile construction for the purpose of preventing the penetration of water into the inner area of the body-work. According to the invention, this is achieved by the sealing washer having at its outer rim a shoulder which encloses the flange and projects beyond the thickness of the latter and, from its inner rim, merges into a collar which projects into the through hole.

By configuring the sealing washer with the shoulder enclosing the flange and the collar projecting into the through hole, particularly reliable sealing results since, firstly, the shoulder projecting beyond the flange thickness is spread outwards as the screw is tightened and therefore as a further module to be fastened is pressed on, as a result of which the shoulder presses firmly against the further module. Secondly, the collar projecting into the through hole is squeezed together in the process and therefore effects particular sealing around the screw, which means that sealing of all the critical points of the plastic nut can be achieved.

The effectiveness of the sealing in the area of the shoulder can be increased by the shoulder being bevelled on its inner side in such a way that its thickness decreases in the direction away from the flange. Furthermore, the outer rim of the flange can likewise be bevelled to accord with the bevel on the sealing washer. In this case, the oblique outer rim of the flange additionally presses the shoulder of the sealing washer outwards as the screw is tightened, which means that the bevelled shoulder bears on the component with a correspondingly larger area.

A further improvement in the sealing action results if a sealing lip oriented towards the nut piece is integrally moulded on the outer rim of the shoulder, and then presses correspondingly snugly against the flange.

In the inner region of the sealing washer, too, its sealing action can also be improved, specifically by the sealing washer merging from its side facing away from the flange into a ring that projects into the aperture. This ring is pressed from the inside against the rim of the aperture and effects its own sealing at this point.

The sealing washer is expediently configured in such a way that it encloses the flange entirely or partially as a covering. In this case, the result is inherent sheathing and encapsulation of the flange, by which means possible leaks between the material of the sealing washer and the flange itself are largely counteracted.

The effect of the collar may be increased by the latter projecting beyond the flange with an extension. Then, when the screw is tightened, the extension ensures that its material encloses the screw particularly closely and under pressure.

Inaccuracy in the final distance between flange and component, caused by the thickness of the sealing washer, may be eliminated by the region of the flange that is covered by the sealing material being provided with protrusions. The use of these protrusions is possible on both sides of the flange. This is advantageous when a further module is to be screwed onto the plastic nut, which is the general case. The result, therefore, in the region of the sealing washer and possibly in the region of the covering, is zones with a particularly high surface pressure without the sealing material itself being interrupted, the final distance between flange and component and possibly the flange and the further module being determined by the height of the protrusions.

It is often necessary to bring the plastic nut provided with the sealing washer to bear firmly on the component by tightening the screw screwed into the nut piece, consideration being given for plate-like components which, for example for tolerance reasons, have different thicknesses. This is done by the sealing washer, apart from the screw, also comprising a compressible spacer which connects the flange and the nut piece in one piece. The spacer, whose height takes into account the thickness of the sealing washer, effects firm contact between the flange on one side of the component and the snap-action hooks on the other side of the component on account of its length being reduced as the screw is tightened, which means that the plastic nut is given a defined, wobble-free position in relation to the component, taking into account the thickness of the sealing washer.

The accommodation hole for the screw can be formed as a blind hole, which means that, in this region, additional sealing results by means of the blind hole.

The plastic nut described above is excellently suited to be produced by injection moulding, which results in a single-piece component, during whose production the sealing washer can also be moulded on to the flange. For the material of the sealing washer, a resilient material composition which is substantially softer than the material of the actual plastic nut can be selected in this production operation. The plastic nut with its sealing washer moulded on in this way is therefore excellently suited to fabrication in large quantities.

Exemplary embodiments of the invention are illustrated in the figures, in which:

FIG. 1 shows the plastic nut in section according to the line I—I from FIG. 3a;

FIG. 2 shows the same plastic nut in a section rotated through 90° according to the line II—II from FIG. 3a;

FIG. 3a shows the same plastic nut in a section according to the line III—III from FIG. 1 with rectilinear spacers;

FIG. 3b shows the same plastic nut in a section according to the line III—III from FIG. 1 with rounded spacers;

Figure 4:
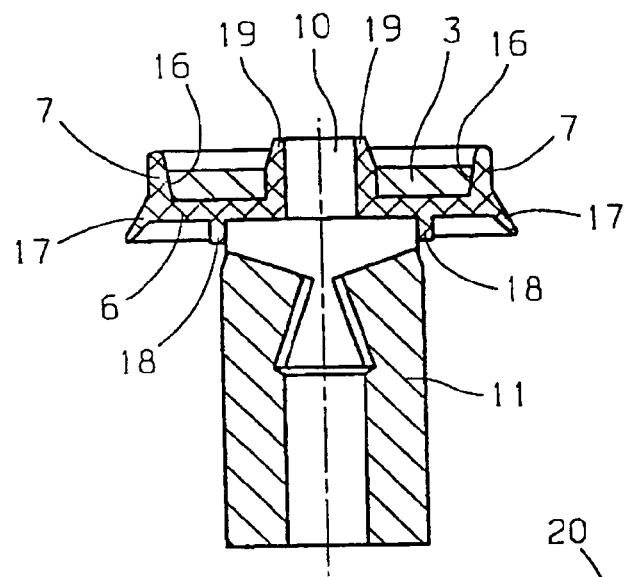
FIG. 4 shows the plastic nut in principle in the same configuration but which has a sealing washer modified as compared with FIGS. 1 and 2.

FIG. 1 shows the plastic nut in section along the line I—I from FIG. 3a, which nut is inserted into the component 1 which has the aperture 2 for this purpose. The plastic nut bears with its flange 3 on the upper side 4 of the component 1. The flange 3 is connected to each other via the spacers 5 which can be seen from FIGS. 2 and 3a, b, which will be discussed in more detail below. The flange 3 is provided with the sealing washer 6, which fills up the area between the flange 3 and the upper side 4 of the component 1. At its outer rim, the sealing washer 6 has the shoulder 7, which is designed to be so high that its upper edge 8 projects beyond the flange 3. At the inner rim of the sealing washer 6, the collar 9 is integrally moulded on the latter, projecting into the through hole 10 of the flange 3. The sealing washer 6 with its shoulder 7 and its collar 9 is configured here as a circular structure and therefore matches the round flange 3. This circular configuration of the shoulder 7 also emerges from FIG. 3.

The plastic nut according to FIGS. 1 and 2 also has the nut piece 11 which, in a known manner, contains the two snap-action hooks 12 and 13 which are spread apart when a screw is inserted into the plastic nut (see FIG. 7) and, in the process, are set behind the component 1 and come into contact with the underside 14 of the component 1. In this way, the plastic nut is firmly held on the component 1 by means of the snap-action hooks 12 and 13 and the flange 3.

In FIG. 2, a section drawn at 90° with respect to the illustration in FIG. 2 is reproduced, running in accordance with the section line II—II from FIG. 3a. FIG. 2 reveals the sealing washer 6 with its shoulder 7 and its collar 9, also showing that the sealing washer 6 comprises the flange 3 and the spacers 5 which are penetrated by the two spacers 5 only along the apertures which can be seen from FIGS. 3a, b. In the region of the sealing washer 6 beside the shoulder 7, the closed region remains between the spacers 5 and the shoulder 7, so that reliable sealing between flange 3 and component 1 is also ensured over this region.

FIGS. 3a and b show a section along the line III—III from FIG. 1, FIGS. 3a and b differing only with regard to the configuration of the spacers 5 (see FIG. 2).

FIG. 3a is based on a plastic nut in which the spacers 5 are designed to be extended rectilinearly and, in this form, pass through the sealing washer 6, as FIG. 2 reveals. In this case, FIG. 3a, on the basis of the section along the line III—III from FIG. 1, shows the viewer the section surface of the sealing washer 6, which encloses the spacers 5 and, although this can be seen only from FIGS. 1 and 2, the flange 3. In this case, the through hole 10 is visible to the viewer in FIG. 3a. The spacers 5 are shown as sectioned rectilinear walls. Between them, the two snap-action hooks 12 and 13 are indicated by dashed lines. The plastic nut according to FIG. 3a is suitable for rectangular apertures in the component.

FIG. 3b shows a configuration modified with respect to the illustration of FIG. 3a, according to which the spacers 5 are rounded, which means that the plastic nut is substantially suitable for round apertures in the component.

FIG. 4 illustrates a plastic screw which, with regard to the configuration of the sealing washer 6, is modified as compared with the embodiment according to FIGS. 1 to 3a, b. Here, the shoulder 7 enclosing the outer edge 16 of the flange 3 is bevelled on its inner side in such a way that its thickness decreases in the direction away from the flange 3. As a result, the flange 7 is imparted the tendency that, when a screw is tightened and a further module (15, see FIG. 6) is fastened, the flange 7 is inclined virtually only outwards and, in the process, bears snugly on the further module without the material of the flange 7 being able to push between this module and the free outer surface of the flange 3. This is undesired since, during the fastening of a further module, the latter is intended to bear snugly on the aforementioned free outer surface of the flange 3, in order that the latter is given a defined position in relation to the plastic nut.

This tendency of the shoulder 7 to kink outwards is further assisted in the embodiment according to FIG. 4 in that the outer edge 16 of the flange 3 is likewise bevelled to accord with the bevel of the shoulder 7.

The sealing washer 6 according to FIG. 4 has a still further special feature, namely the sealing lip 17, into which the outer rim of the shoulder 7 emerges. This sealing lip 17 is oriented towards the nut piece 11 and, when the screw is tightened, bears on the component and is squeezed radially away outwards by the latter (see FIG. 6) which means that the sealing action of the side of the sealing washer 6 which faces the component 1 is correspondingly intensified.

A further special feature of the sealing washer 6 according to the plastic nut according to FIG. 4 consists in the sealing washer 6 having, on its side facing away from the flange 3, the ring 18 which projects into the component 1 (see FIG. 1), substantially in the axial course of the aperture 2 not shown in FIG. 4, and here ensures sealing with respect to the aperture 2.

With regard to the configuration of the sealing washer 6, the plastic nut illustrated in FIG. 4 contains a further special feature, which consists in the collar 9 projecting beyond the flange 3 with the extension 19. The extension 19 is bevelled radially inwards which, when a screw is tightened and a further component is pressed on (see FIG. 6), leads to the extension 19 being forced away inwards in the direction of the screw and therefore bearing particularly closely on and around the screw. In this case, the extension 19 does not have the tendency to tilt away outwards in the radial direction as well which, for the reasons presented above, would not be desirable, since in this case material from the sealing washer would get between the module to be screwed on and the outer surface of the flange.

It should be pointed out that, of course, all the special features illustrated in conjunction with FIG. 4 as compared with the embodiment according to FIG. 1 can additionally be applied on their own to the embodiment according to FIG. 1.

The embodiment of the plastic nut according to FIG. 5 is again based on the basic configuration of the plastic nut according to FIGS. 1 to 3a, b but again with a modification of the sealing washer 6 and of the flange 3. Here, the sealing washer 6 forms a complete covering over the flange 3, which here extends as a cover 20 over the flange 3. This achieves the situation where the flange 3 is sealed off from all sides. The flange 3 itself is here provided with protrusions 21, specifically on its upper side and its underside, which extend partially into the material of the sealing washer 6 and the cover 20, that is to say into the covering. Because of the arrangement of the protrusions 21, when a screw is tightened and a further module is pressed on (see FIG. 6), the result is a high surface pressure and pressing of the material of the sealing washer 6 away over the protrusions 21, of which material in each case only a thin film remains for each protrusion 21, but this is sufficient for a seal to continue to exist. During this procedure, that side of the flange 3 which faces the component 1 bears with its protrusions 21, apart from the remaining film, on this side of the component 1, which correspondingly also takes place on that side of the flange 3 which faces away from the component 1 as a result of a further module being pressed on, so that ultimately the further module is held at a defined distance, given by the thickness of the flange 3 and the height of the protrusions 21, from the component 1 with the screw tightened.

Figure 5:
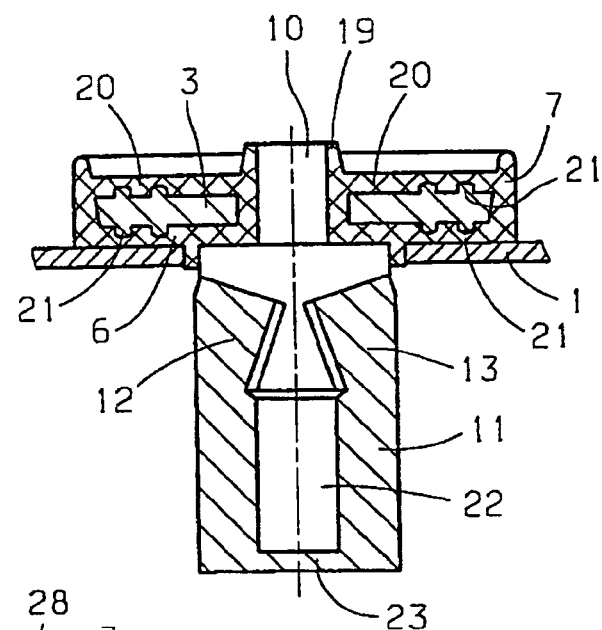
FIG. 5 shows the plastic nut in principle in the same configuration but in which the flange is provided with protrusions.

In FIG. 5, the nut piece in 11 is illustrated with a special feature. Here, with regard to its threaded hole 22, the nut piece 11 is closed off by the base 23, which therefore means that the threaded bole 22 is formed as a blind hole in the embodiment according to FIG. 5.

Figure 6:
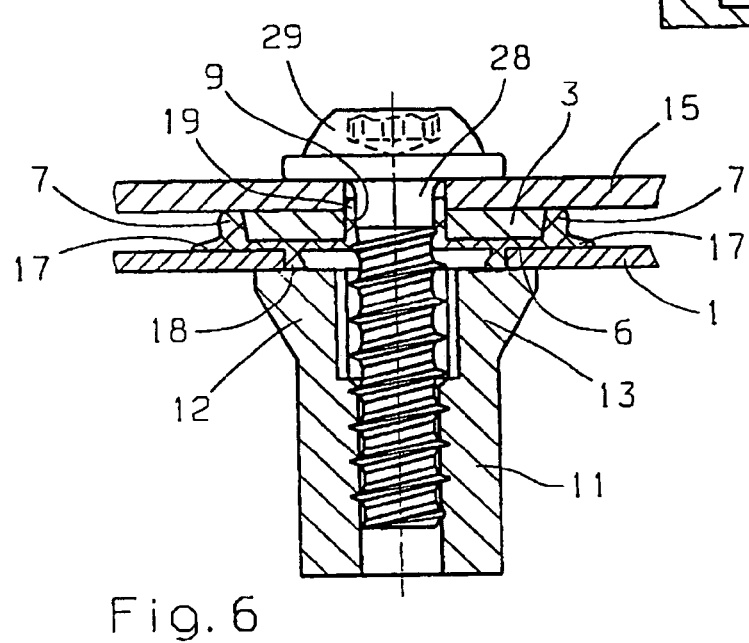
FIG. 6 shows the plastic nut in a section corresponding to FIG. 4, with which nut a further module is connected to the component carrying the plastic nut.

In FIG. 6, the plastic nut, which substantially corresponds to that according to FIG. 4, is illustrated in interaction with a component 1 and a further module 15 to be fitted thereto, for which purpose the screw 28 is inserted into the through hole 10 (see FIG. 4) and the threaded hole 22 and is tightened, the screw head 29 bearing on the module 15 and the latter bearing firmly on the component 1 with the interposition of the flange 3. The snap-action hooks 12 and 13 are spread apart in this case and bear on the underside 14 of the component 1. In this case, the sealing washer 6 is compressed highly and its shoulder 7 is forced away outwards, therefore bearing snugly on that side of the module 15 which faces the shoulder 7 and additionally effects sealing here. In a corresponding way, the sealing lip 17 (see FIG. 4) has also been placed flat on the component 1. Furthermore, the ring 18 projects into the aperture 2 (see FIG. 1) of the component 1 and additionally seals off the latter. Finally, the collar 9 with its extension 19 has the effect of enclosing the thread-free neck of the screw 28, around which the collar 9 and the extension 19 are squeezed, and therefore also seals off the screw 28 in relation to the space assumed by the nut piece 11. Overall, there is now particularly effective sealing of the region that accommodates the screw head 29 and the region occupied by the nut piece 11, which also applies in the case in which any pull-off forces act on the module 15 in relation to the component 1. In this case, if the tendency arises for the flange 3 together with the module 15 to be moved slightly away from the component 1, then this enlargement of the space between flange 3 and component 1 which, according to FIG. 6, is defined by the compressed sealing washer 6, will be loosened somewhat, but this can be compensated for in particular by the shoulder 7 and the sealing lip 17, which follow resiliently in this case. In the process, in the region around the thread-free neck of the screw 28, nothing changes in the sealing relationships, so that the sealing effected here by the collar 9 and the extension 19 remains unaffected by the process outlined above. Overall, therefore, even under special loadings which act on the module 15, there is particularly reliable sealing.

What is claimed is:

1. Plastic nut to be fitted to a component (1) having an aperture (2), which includes a nut piece (11) adapted for insertion into the aperture (2) and which has an insertion hole (22) that serves to hold a screw (28), a flange (3) to bear on one side (4) of the component (1), wherein the flange (3) has a through hole (10) for the screw (28), an outer edge, a surface facing the component, and a surface facing away from the component, a separate sealing washer (6) integrally provided on a side of the flange (3) facing the component (1), and snap-action hooks (12, 13) to bear on an opposite side (14) of the component (1) and which, after insertion, spread out as the screw (28) is tightened in the insertion hole (22) in the plastic nut to secure the plastic nut to the component (1), characterized in that the sealing washer (6) includes a shoulder and a collar and encloses the flange (3) with the shoulder (7) of the sealing washer embracing the outer edge of the flange (3) and the collar (9) of the sealing washer projecting into the through hole (10), wherein the shoulder (7) of the sealing washer is beveled on an inner side in such a way that its thickness decreases in the direction away from the nut piece (11).

2. Plastic nut according to claim 1, characterized in that the collar (9) projects beyond the flange (3) with an extension (19).

3. Plastic nut according to claim 1, characterized in that the sealing washer (6) comprises a compressible spacer (5) that connects the flange (3) and the nut piece (11) in one piece.

4. Plastic nut according to claim 1, characterized in that the insertion hole (22) for the screw (28) is formed as a blind hole.

5. Plastic nut according to claim 1, characterized by single-piece formation by injection moulding with a sealing washer (6) injected onto the flange (3).

6. Plastic nut according to claim 1, characterized in that the outer edge (16) of the flange (3) is beveled in accordance with the bevel of the shoulder (7).

7. Plastic nut according to claim 6, characterized in that the sealing washer (6) merges from a side facing away from the flange (3) into a ring (18) that projects into the aperture (2).

8. Plastic nut to be fitted to a component (1) having an aperture (2), which includes a nut piece (11) adapted for insertion into the aperture (2) and which has an insertion hole (22) that serves to hold a screw (28), a flange (3) to bear on one side (4) of the component (1), wherein the flange (3) has a through hole (10) for the screw (28), an outer edge, a surface facing the component, and a surface facing away from the component, a separate sealing washer (6) integrally provided on a side of theflange (3) facing the component (1), and snap-action hooks (12, 13) to bear on an opposite side (14) of the component (1) and which, after insertion, spread out as the screw (28) is tightened in the insertion hole (22) in the plastic nut to secure the plastic nut to the component (1), characterized in that the sealing washer (6) includes a shoulder and a collar and encloses the flange (3) with the shoulder (7) of the sealing washer embracing the outer edge of the flange (3) and the collar (9) of the sealing washer projecting into the through hole (10), wherein the shoulder (7) of the sealing washer merges into a sealing lip (17) oriented towards the nut piece (11).

9. Plastic nut according to claim 8, characterized in that the sealing washer (6) merges from a side facing away from the flange (3) into a ring (18) that projects into the aperture (2).

10. Plastic nut according to claim 8, characterized in that the collar (9) projects beyond the flange (3) with an extension (19).

11. Plastic nut according to claim 8, characterized in that the sealing washer (6) comprises a compressible spacer (5) that connects the flange (3) and the nut piece (11) in one piece.

12. Plastic nut according to claim 8, characterized in that the insertion hole (22) for the screw (28) is formed as a blind hole.

13. Plastic nut according to claim 8, characterized by single-piece formation by injection moulding with a sealing washer (6) injected onto the flange (3).

14. Plastic nut to be fitted to a component (1) having an aperture (2), which includes a nut piece (11) adapted for insertion into the aperture (2) and which has an insertion hole (22) that serves to hold a screw (28), a flange (3) to bear on one side (4) of the component (1), wherein the flange (3) has a through hole (10) for the screw (28), an outer edge, a surface facing the component, and a surface facing away from the component, a separate sealing washer (6) integrally provided on a side of the flange (3) facing the component (1), and snap-action hooks (12, 13) to bear on an opposite side (14) of the component (1) and which, after insertion, spread out as the screw (28) is tightened in the insertion hole (22) in the plastic nut to secure the plastic nut to the component (1), characterized in that the sealing washer (6) includes a shoulder and a collar and encloses the flange (3) with the shoulder (7) of the sealing washer embracing the outer edge of the flange (3) and the collar (9) of the sealing washer projecting into the through hole (10), wherein a region of the flange (3) that is covered by the sealing washer (6) faces the component (1) and is provided with protrusions (21).

15. Plastic nut according to claim 14, characterized in that the sealing washer (6) merges from a side facing away from the flange (3) into a ring (18) that projects into the aperture (2).

16. Plastic nut according to claim 15, characterized in that the collar (9) projects beyond the flange (3) with an extension (19).

17. Plastic nut according to claim 16, characterized in that the sealing washer (6) comprises a compressible spacer (5) that connects the flange (3) and the nut piece (11) in one piece.

18. Plastic nut according to claim 17, characterized in that the insertion hole (22) for the screw (28) is formed as a blind hole.

19. Plastic nut according to claim 18, characterized by single-piece formation by injection moulding with a sealing washer (6) injected onto the flange (3).

20. Plastic nut to be fitted to a component (1) having an aperture (2), which includes a nut piece (11) adapted for insertion into the aperture (2) and which has an insertion hole (22) that serves to hold a screw (28), a flange (3) facing one side (4) of the component (1), wherein the flange (3) has a through hole (10) for the screw (28), a separate sealing washer (6) integrally provided on the side of the flange (3) facing the component (1), and snap-action hooks (12, 13) to bear on an opposite side (14) of the component (1) and which, after insertion, spread out as the screw (28) is tightened in the insertion hole (22) in the plastic nut to secure the plastic nut to the component (1), characterized in that the sealing washer (6) encloses the flange (3) completely on upper and lower sides of the flange (3) having at its outer edge a shoulder (7), and its inner rim a collar (9) projecting into the through hole (10), whereby a region of the flange (3), which faces the component (1), is provided with protrusions (21) and the outer rim of the shoulder (7) merges into a sealing lip (17) oriented towards the nut piece (11).

* * * * *